United States Patent [19]

Fender et al.

[11] Patent Number: 4,639,586
[45] Date of Patent: Jan. 27, 1987

[54] OPTICALLY PHASED LASER TRANSMITTER

[75] Inventors: Janet S. Fender, Albuquerque, N. Mex.; Salvatore J. Cusumano, Champaign, Ill.; Robert R. Butts, Colorado Springs, Colo.; Christopher R. DeHainaut, Albuquerque, N. Mex.

[73] Assignee: The United States of America as represented by the Secretary of the Air Force, Washington, D.C.

[21] Appl. No.: 698,962

[22] Filed: Feb. 6, 1985

[51] Int. Cl.$^4$ ............................ G01J 1/20; G01B 9/02
[52] U.S. Cl. ........................................ 250/201; 356/354
[58] Field of Search .............................. 356/354, 346; 250/201 R, 203 R, 550, 578; 343/5 CM; 330/4.3

[56] References Cited

U.S. PATENT DOCUMENTS

| | | | |
|---|---|---|---|
| 3,599,112 | 8/1971 | Holtz | 331/94.5 |
| 4,016,415 | 4/1977 | O'Meara | 250/201 |
| 4,136,954 | 1/1979 | Jamieson | 356/346 |
| 4,239,392 | 12/1980 | Pohle | 356/354 |
| 4,264,869 | 4/1981 | Hunter | 330/4.3 |
| 4,295,741 | 10/1981 | Palma et al. | 250/201 |
| 4,326,800 | 4/1982 | Fitts | 356/152 |
| 4,371,946 | 1/1983 | Constantinides et al. | 250/203 R |
| 4,384,198 | 5/1983 | Williamson | 250/203 R |
| 4,413,909 | 11/1983 | Pohle | 356/354 |

OTHER PUBLICATIONS

A. B. Meinel, "Aperture Synthesis Using Independent Telescopes", *Applied Optics,* Nov. 1970, vol. 9, No. 11, pp. 2501-2504.

*Primary Examiner*—David C. Nelms
*Assistant Examiner*—Michael Messinger
*Attorney, Agent, or Firm*—William G. Auton; Donald J. Singer

[57] ABSTRACT

An apparatus and technique are described for phasing the outputs of a multiplier telescope array used as a laser transmitter. The technique uses samples of the transmitted beams to control optical path lengths through the separate telescopes so that the beams add coherently at the receiver. The phasing concept is applicable both to systems which provide inputs to the multiple telescopes by dividing a single laser beam and to systems in which the inputs to the telescopes and multiple, phase-locked laser beams. The approach is also compatible with single line and multi-line lasers, and it does not entail stringent alignment requirements. The concept uses a procedure to find the zero optical path difference condition and to effect fine control of the optical path lengths through the different telescopes. Algorithms are described for estimating the phase mismatch from focal plane measurements.

17 Claims, 16 Drawing Figures

INTERFEROGRAM IMAGED
ON CCD CAMERA

COMPUTER GENERATED VISIBILITY

OPTICALLY PHASED LASER TRANSMITTER

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to optical laser telescopes, and more specifically to a technique and apparatus for optically phasing an array of multiple telescopes for use as a laser transmitter.

A synthetic aperture is formed when separate optical systems are combined to function as a single larger aperture. When an aperture is synthesized, independent optical systems are phased to form a common image field with resolution determined by the maximum dimension of the array and therefore exceeding that produced by any single element. By optically phasing an array of multiple telescopes, a synthetic aperture is formed which can achieve the performance of an equivalent sized, single laser transmitter.

Phased arrays are currently in use in radar systems. The successful application of phasing an array of multiple telescopes into a synthetic aperture extends the numerous benefits of using arrays, as experienced by radar systems, to optical laser telescopes.

Phased arrays are modular. They can be built in stages and to some extent be operational as soon as the first telescope is operational. An array of independent telescopes has functional flexibility. Several simultaneous operations can be carried out by individual telescopes within a synthetic aperture. For example, images can be directed to different cameras or spectrographic devices for simultaneous observations in separate imaging modes. When operated as a transmitter, a synthetic aperture has the option of sending beams in different directions.

Phased array apertures have virtually no size limitations. By modularly combining telescopes in a phased configuration, laser transmitters of previously unimaginable sizes can be constructed. Large optics fabrication has historically posed an impermeable barrier to building large aperture telescope systems. By phasing a number of reasonably-sized telescopes, extremely large transmitting apertures ca be achieved with present fabrication technology.

The optical phasing of separate transmitted beams, can be achieved by maintaining matched optical paths, when the laser transmitter is a system which provides inputs into multiple telescopes by dividing a single beam.

Techniques for achieving and maintaining matched optical paths fall into four general categories:

(1) Structural or optical metering trusses;
(2) local loop phasing;
(3) target loop phasing; and
(4) hybrids or combinations of the above techniques.

The structural metering truss requires thermal control to maintain its integrity. For large systems operating at infrared or optical wavelengths, position monitoring of the structure is also required. An optical metering truss can be formed by a device such as a fan beam. Tolerances associated with the elements that produce an optical truss are a major disadvantage to the approach.

Target loops insure that an array is phased in the far field. The target may very well be a star in which case white light interferometry can be employed. Difficulties include possible low signal to noise ratios and a requirement for aperture sharing elements. Because focal arrays have an inherently limited phased field of view, phasing on targets introduces the prospect of an out-of-phase observation plane. Also, when phasing on nearby fast-moving targets, Doppler effects must be taken into account.

The present invention uses local loop phasing to control the phase of separately transmitted beams by adjusting the optical path lengths of the beam. Local loop phasing is an indirect measurement of the quantity of interest. Typically, a single source is injected into the system and divided to traverse the separate paths of all telescopes to be phased. Beams are recombined at a common plane for phase monitoring and control. White light interferometry with a Koester prism is a good example of local loop phasing. This technique is quite suitable for an imaging synthetic aperture. A transmitter, however, in this configuration is limited to a single source or a combination of local loop phasing and a separate operation for phasing multiple sources. Furthermore, beam injection requires an aperture sharing element which has fabrication drawbacks.

The optical phasing of separate transmitted beams of laser transmitters with monochromatic light sources is achieved by matching the optical paths. In systems which have polychromatic sources, the optical path lengths are adjusted.

Monochromatic light requires phasing only within a range of one wavelength. Polychromatic sources cannot tolerate $2\pi$ ambiguities and therefore require both coarse and fine phase adjustments for multi-wavelength interference.

The present invention uses samples of the transmitted beams to control optical path lengths through the separate telescopes so that the beams add coherently at the receiver. The phasing concept is applicable both to systems which provide inputs to the multiple telescopes by dividing a single laser beam and to systems in which the inputs to the telescopes are multiple, phase-locked laser beams. The approach is also compatible with single line and multi-line lasers since all wavelengths are unambiguously phased. The application of the technique of the present invention extends the many benefits, described above, of using phased arrays, to optical laser telescopes. An excellent example of the current application of laser telescopes is contained in U.S. Pat. No. 4,295,741 issued to Gary E. Palma et al on Oct. 20, 1981, the disclosure of which is incorporated by reference. Palma et al disclose a laser transmitter system which achieves phase matching between a first and second laser beam emitted through first and second laser telescopes. While the disclosure of Palma et al is exemplary in the art, the laser source used therein is a single multi-line laser. The phasing of an array of separate and independent sources of multiple laser telescopes would result in the equivalent of a single laser transmitter, with all the advantages of phased arrays, as discussed above and as currently incorporated in radar technology.

In view of the foregoing discussion, it is apparent that there currently exists the need for an optical phase sensing and control system, which allows multiple independent optical telescopes to be used as a phased array in a laser transmitter. The present invention is directed towards satisfying that need.

SUMMARY OF THE INVENTION

The present invention provides a means of optically phasing an array of multiple telescopes, each of which has their own independent single laser source, into a synthetic aperture, which potentially achieves the performance of a single laser transmitter of an equivalent size. The apparatus and technique of the present invention uses samples of the transmitted beams to control optical path lengths through the separate telescopes so that the beams add coherently at the receiver. The phasing concept is applicable both to systems which provide inputs to the multiple telescopes by dividing a single laser beam and to systems in which the inputs to the telescopes are multiple, phased-locked laser beams. The approach is also compatible with single line and multi-line lasers since all wavelengths are unambiguously phased.

An example of the present invention consists of two optical telescopes which become useable as a laser transmitter when combined with an optical phase matching system consisting of: a collecting telescope, a detector array, two fold mirrors, analog-to-digital converter, microprocessor, and two sets of correcting mirrors.

The two optical telescopes are adjacent to each other and transmit two separate outgoing laser beams which require phase matching. The original source of the two outgoing beams may be either: a single laser beam, which has been divided (monochromatic); or two separately transmitted polychromatic laser beams.

The collecting telescope sits in front of the two optic telescopes and bridges the gap between them. In this way, the collecting telescope is able to intercept samples of outgoing laser beams from the edges of both telescopes and focus them, through the two fold mirrors to the detector array.

The detector array may be either a line scan or an area charge coupled device (CCD), which reads out the fringe pattern by generating an interference pattern.

The analog-to-digital converter converts the analog output of the CCD to digital and sends it to the microprocessor which uses the interference pattern to determine the relative phase difference between the two beams using one of a number of phase estimating algorithms (which are part of the invention).

Once an accurate estimate of the phase difference is determined, the estimated error is used to adjust the phase by the correcting mirrors which adjust the optical path lengths of the two outgoing beams.

Monochromatic light requires phasing only within a range of one wavelength. Polychromatic sources cannot tolerate $2\pi$ ambiguities and therefore require both coarse and fine phase adjustments for multi-wavelength interference. Both the coarse and fine tuning refer to the phase estimating algorithms which provide adjustments to the optical path lengths of the two beams.

By constructing a synthetic aperture and using the principles of the example, described above, multiple independent optical telescopes can be used as a phase array in a laser transmitter.

Note that this application incorporates by reference a patent application filed by Richard A. Carreras entitled "Microcomputer Controlled Image Processor" and described in U.S. patent application Ser. No. 689,700, filed Jan. 8, 1985. Mr. Carreras, provides a detailed apparatus and technique to calculate the optical phase difference for two signals from an interference pattern provided by the CCD camera.

It is an object of the present invention to provide a means of optically phasing an array of telescopes into a laser transmitter.

It is another object of the present invention to provide a laser transmitter with virtually no size limitation.

It is another object of the present invention to provide a method of optical phase sensing capable of detecting the difference in phase between the transmitted beams of two adjacent telescopes.

It is another object of the present invention to provide a method of optical phase control capable of adjusting the phase of the transmitted beams of two adjacent telescopes by controlling the optical path length.

It is another object of the present invention to obtain matched optical path lengths between two adjacent telescopes which emit monochromatic beams.

It is another object of the present invention to adjust the optical path lengths between the two adjacent telescopes which emit polychromatic sources using both coarse and fine phase adjustments.

These together with other objects, features and advantages of the invention will become more readily apparent from the following detailed description when take in conjunction with the accompanying drawings wherein like elements are given like reference numerals throughout.

DESCRIPTION OF THE PREFERRED EMBODIMENT

The present invention provides a technique and apparatus for optically phasing an array of multiple telescopes for use as a laser transmitter. The technique uses samples of the transmitted beams to control optical path lengths through the separate telescopes so that the beams add coherently at the receiver. The phasing concept is applicable both to systems which provide inputs to the multiple telescopes by dividing a single laser beam and to systems in which the inputs to the telescopes are multiple, phase-locked laser beams. The approach is also compatible with single line and multi-line lasers since all wavelengths are unambiguously phased.

Optically phasing separate transmitted beams is accomplished by sampling adjacent outgoing wavefronts. A network of auxilliary collecting optics intercepts pairs of beams and combines them on a focal plane detector. The relative phase of sampled beams is measured by the interference pattern produced when the beams are combined. A symmetrical interference pattern indicates phased beams. Small mirrors in the beam train operate as an optical trombone to increase or decrease optical path lengths and thereby phase match the telescopes.

This configuration does not rely on the integrity of telescope supporting structures nor does it entail stringent alignment requirements. The key feature of this invention is the concept of sampling outgoing wavefronts from separate telescopes and combining them interferometrically to measure relative phases. Telescopes are phased pair-wise which means that a huge number of telescopes can be combined to form transmitting apertures of sizes previously unachievable.

Figure 1:
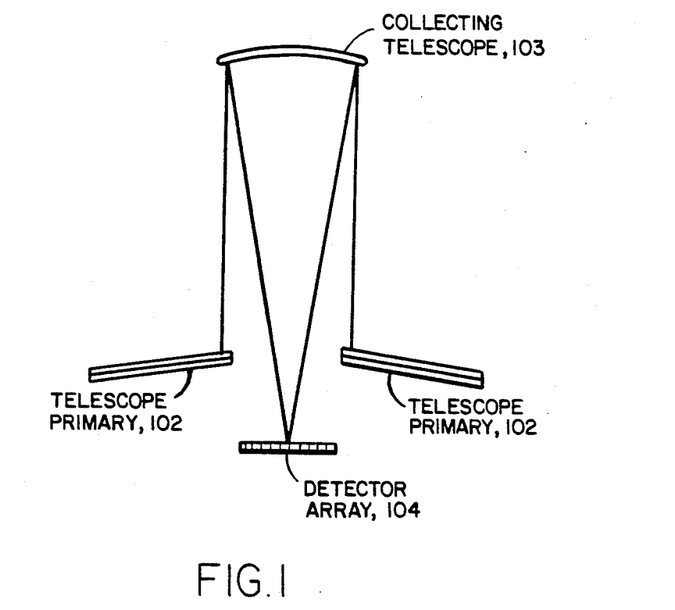
FIG. 1 is a sketch of the technique of the present invention as it applies to an array containing two primary telescopes.

The technique of the present invention, as it applies to an array consisting of only two primary telescopes, is illustrated in FIG. 1. The two primary telescopes 101 and 102 are transmitting telescopes, which are positioned very close to each other. Laser telescopes are known in the art, as exemplified by the Palma et al reference, and need not be described further other than to make clear that the two primary telescopes 101 and 102, of FIGS. 1 and 2, each possess an independent single laser source so that each transmits a separate and independent laser beam. The collecting telescope 103 (not drawn to scale) sits in front of the two transmitting telescopes 101 and 102 and bridges the gap between them. In this way, the collecting telescope 103 is able to intercept samples of outgoing laser beams from the edges of both primary telescopes and focus them of the detector array 104 where an interference pattern is created. The measurement of the interference pattern will be converted to digital and used to determine the phase difference between the two beams from the primary telescopes.

Figure 2:
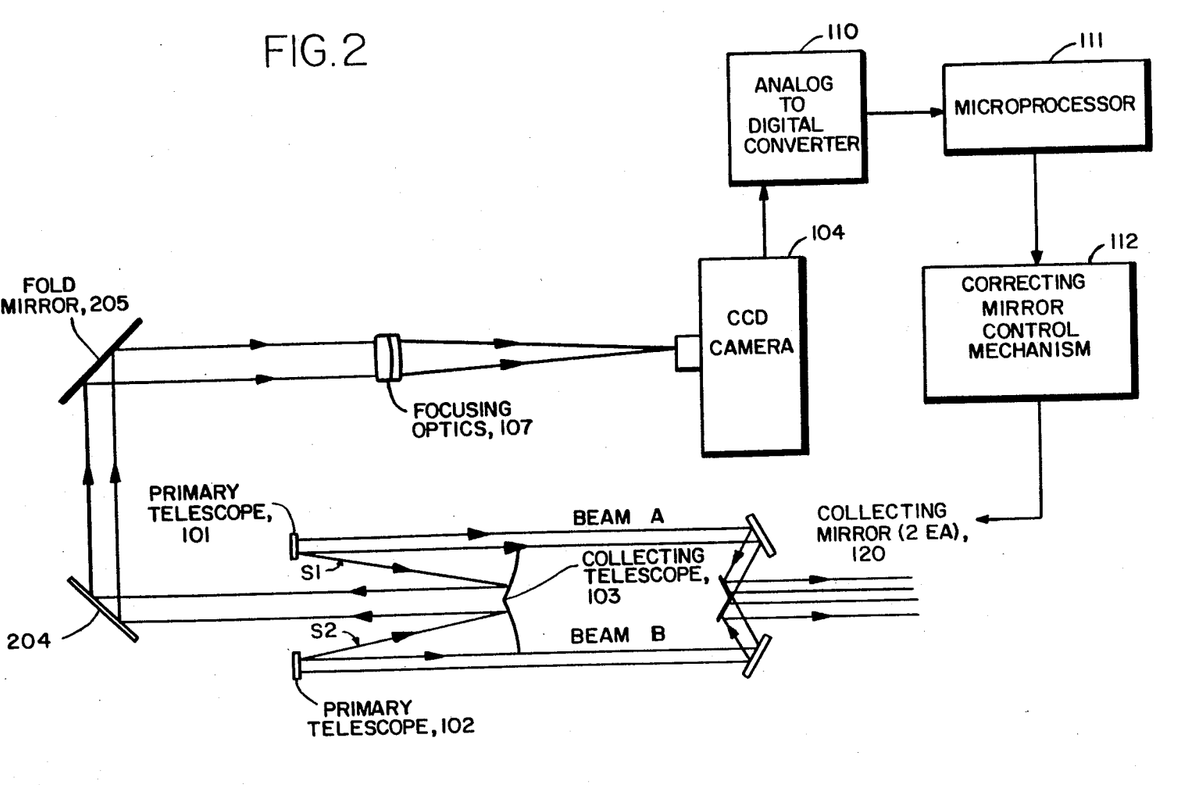
FIG. 2 is a block diagram of the present invention using two primary telescopes in an array.

FIG. 2 is a functional block diagram of an optically phased laser transmitter which uses two primary telescopes in an array. As shown in FIG. 1, the primary telescopes 101 and 102 emit two independent laser beams A and B, which may be either monochromatic or polychromatic beams.

The collecting telescope 103 collects samples of the outgoing laser beams from the edges of both telescopes 101 and 102. This sampling is accomplished by the collecting telescope by partially blocking the path of the outgoing laser beams with a mirror, and reflecting the blocked portion of the beams back towards the fold mirrors 204 and 205. Note that FIG. 2 is intended to schematically illustrate the function of the collecting telescope by depicting two sampled beams $S_1$ and $S_2$ from the primary telescopes 101 and 102, but one skilled in the art will recognize that the actual reflecting phenomenon of the collecting telescope is actually accomplished as depicted in FIG. 1. The collected samples are then conducted by fold mirrors 204 and 205 to the focusing optics 107, which serves to focus the samples to a common point on the array of detectors 104 where an interference pattern is created. In the embodiment of the invention of FIG. 2, the detector array is a CCD camera, which generates the interference pattern by reading of the fringe pattern. However, a line scan or other elements known in the art are also suitable as a means of detecting the interference pattern.

From the CCD camera 104, the measurement of the interference pattern is used by a signal processing means to determine the relative phase difference between the two beams. This signal processing means consists of the analog-to-digital converter 110 which digitizes the output of the CCD camera 104, and a microprocessor 111 which uses the unique phase generating algorithms, described below, on the interference pattern between the two sampled beams, to estimate the difference in phase between the two beams. Once the phase difference is known, the optical path length of the two beams A and B from the primary telescopes 101 and 102 can be adjusted by the set of correcting mirrors 120, as controlled by the control mechanism 112.

Monochromatic light requires phasing only within a range of one wavelength. Polychromatic sources cannot tolerate $2\pi$ ambiguities and therefore require both coarse and fine phase adjustments for multi-wavelength interference. Both the coarse and fine tuning refer to the phase estimating algorithms which provide adjustments to the optical path lengths of the two beams.

Figure 3:
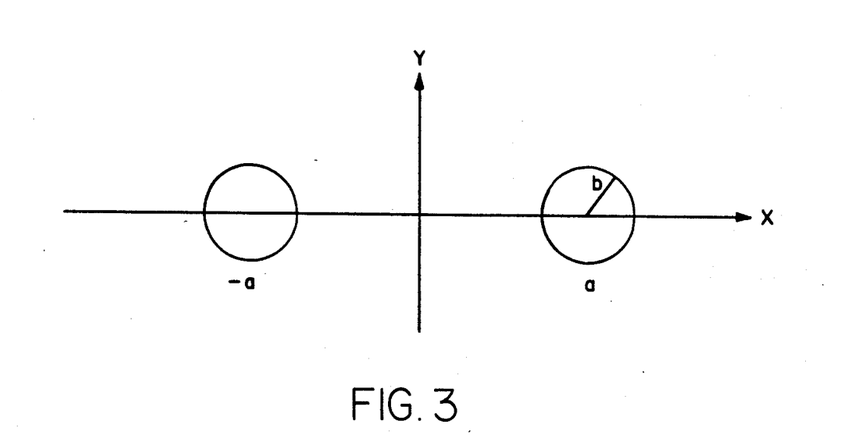
FIG. 3 is an illustration of the beam geometry of two samples focused on the detector array.

FIG. 3 is an illustration of the beam geometry of the two samples of laser beams, which are brought to a common focus on the detector array 104 of FIG. 2. The two samples are separated by a distance of 2a at their centers, and each circular sample has a radius b. If the laser beams exiting the telescopes are pointed in the same direction and focused to the same range, then the beam samples will focus to the same point creating an interference pattern which will be measured by the detector array. If the laser radiation consists of N different wavelengths $\lambda_n$; (n=1,2, ... N), then the measured irradiance pattern will be the sum of the irradiances of the individual frequencies.

Let $I_n(r)$ denote the irradiance in the focal plane at the position r=(x,y) and at the wavelength $\lambda_n$. Then:

$$I_n(r) = (2A_n b/r)^2 J_1^2(K_n rb/F) \cdot [1 + \cos(K_n(d - + 2ax/F))] \quad (1)$$

where
$A_n$ is the amplitude at wavelength $\lambda_n$ of the beam samples;
$K_n = 2\pi/\lambda_n$;
F is the focal length of the collecting optics; and
d is the difference in the optical path lengths of the two transmitted beams.

As indicated in FIG. 3, the sample beams are circular with a radius b, and are separated by a distance 2a along the x axis. The irradiance pattern, $I_n(r)$ of Equation 1 consists of two parts: an envelope function which is just the familiar Airy pattern which would be created by a single sample beam and a modulation or interference term, the term in brackets. Note that only the interference term depends on the OPD. As the OPD varies, the interference pattern translates under a stationary envelope.

Figure 4:
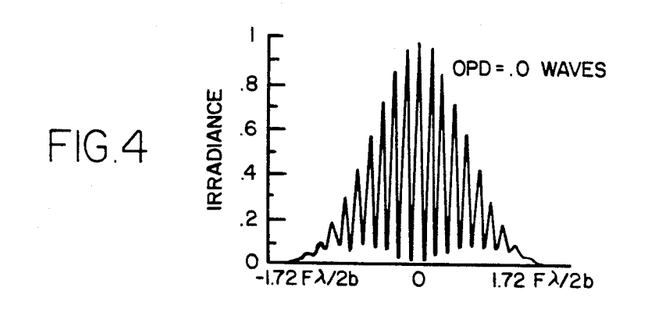
FIGS. 4, 5 and 6 are charts of interferograms imaged on the CCD camera of FIG. 2.
Figure 5:
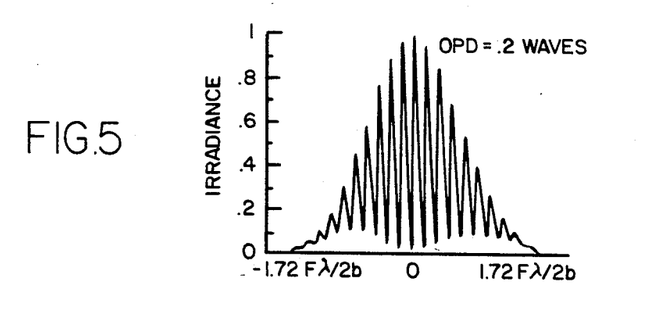
Figure 6:
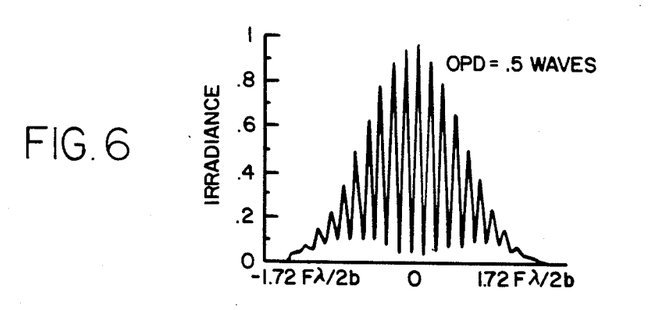

FIGS. 4, 5 and 6 are charts of interferograms which are imaged on the CCD camera 104 of FIG. 2. FIG. 4 is a slice along the x axis in the the focal plane, which is created by interfering the sampled beams. In FIG. 4, the beam samples are perfectly in phase and OPD is zero waves. The vertical axis of the chart indicates the irradiance and the horizontal axis indicates position locations along the x axis of FIG. 3 where:

F=the focal length of the sampling optics,
λ=the mean wavelength; and
b=the radius of the samples.

FIGS. 5 and 6 are also slices along the x axis, but in FIG. 5 there exists an optical path difference of λ/5 between the two beam samples, and in FIG. 4 there is an optical path difference of λ/2 between the two beam samples.

Figure 7:
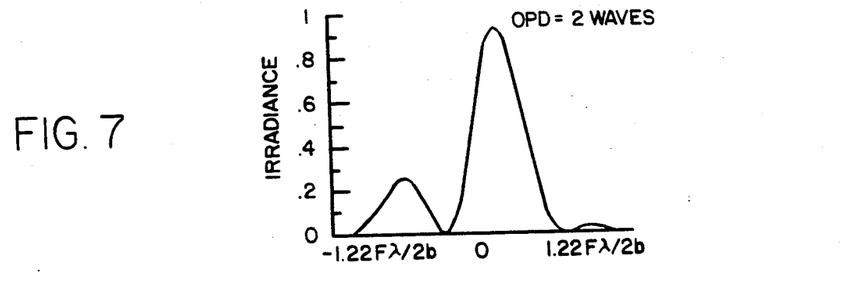
FIGS. 7, 8 and 9 are charts of the far-field patterns of the interferograms of FIGS. 4, 5 and 6 respectively.
Figure 8:
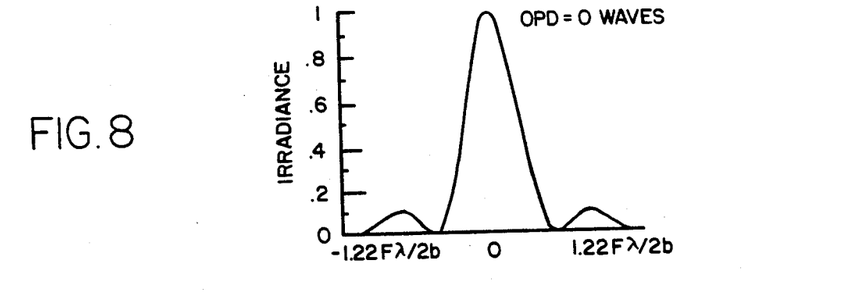
Figure 9:
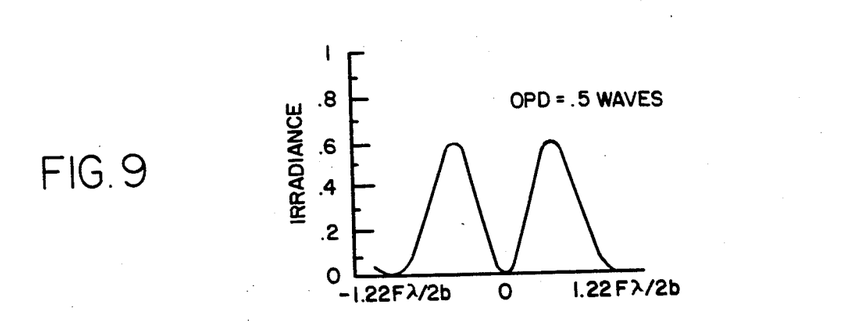

FIGS. 4, 5 and 6 show the interference pattern across a central Airy disc created by focusing two beam samples with separation and diameter in a ratio of 10:1 and optical path length differences (the quantity d in equation 10) of 0, 0.2, and 0.5 waves respectively. The computation assumed that the laser output was at eight discrete frequencies. The "waves" of optical path difference refer to the power weighted average wavelength. If the full telescopes from which the samples originate are contiguous, then the contribution to the far-field pattern of the two telescopes will be as illustrated in FIGS. 7, 8 and 9.

Figure 10:
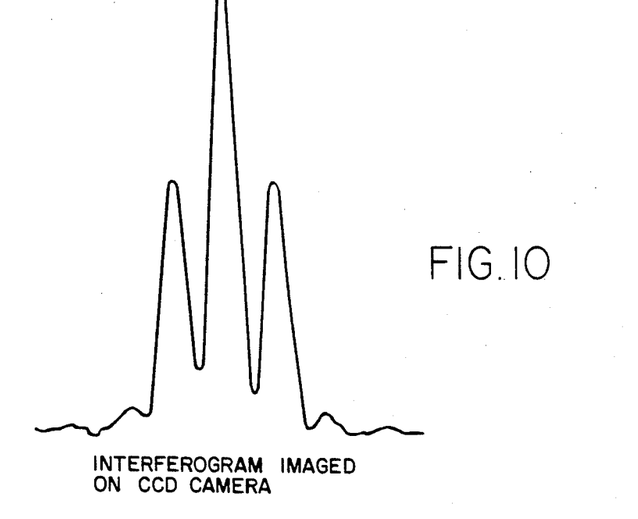
FIG. 10 is a sketch of an interferogram output.

FIG. 10 is a simplified sketch of an interferogram output of the CCD camera 104 of FIG. 2. This interferogram has a main peak and subsidiary peaks to the right and left of the main peak. The microprocessor obtains the digitized interference measurement from the analog-to-digital converter 110 and using one of the approaches, defined below, estimates the optical path difference between the two beams which are being compared.

The first approach of the microprocessor to estimate the optical path difference (OPD) is from the invention, referenced above, of Richard Carreras, and is entitled "the linear algorithm" and is given by:

$$OPD = \frac{\int R - \int L}{\int R + \int L} \quad (2)$$

where R and L are measures of the subsidiary peaks to the left and right of the main peak. The present invention presents a variety of algorithms, discussed below, which are used to calculate the R and L values, which are then used by the "linear algorithm" to yield the OPD. The formula of the "linear algorithm" compares the integrated intensity of the two adjacent sidelobes and normalizes the quantity by their sum. The above algorithm works well for single or multiple wavelength sources and, when solved, yields the optical path difference in waves. The "waves" of optical path difference refer to the power average wavelength of the two sampled laser beams.

Because of the 2π ambiguity of the linear OPD algorithm, a global algorithm was developed by Richard A. Carreras in his invention, referenced above, to find the zero fringe. This algorithm would be required when phasing a multiline system since maximum interference occurs only with zero OPD. The global algorithm used is a variation of the classical definition of visibility, and is:

$$V = \frac{I_{max} - I_{min}}{I_{max} + I_{min}} \quad (3)$$

where $I_{max}$ and $I_{min}$ are single values of maximum and minimum intensities.

Figure 11:
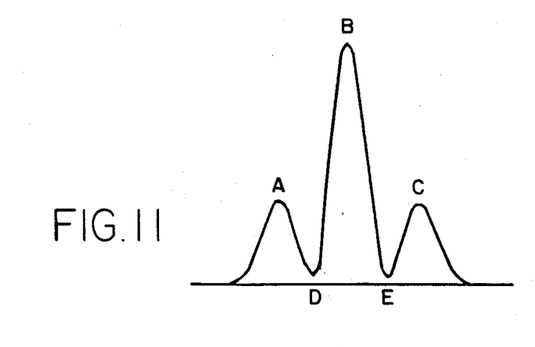
FIG. 11 is a focused fringe pattern.

FIG. 11 is a focused fringe pattern which is offered to illustrate the use of the global algorithm. In FIG. 11, points A through E are values of intensity measured by a single pixel. The formula is easily implemented, since A, D, E and C are always referenced to B. That is, finding B, determines A, D, E and C to the nearest pixel. Thus, there is no requirement to perform multiple peak and valley searches. A single search for the peak, B, suffices.

The global algorithm of Equation 3 when applied to the interference pattern of FIG. 11 gives the following result in terms of visibility:

$$V = \frac{(A - D) + (B - D) + (B - E) + (C - E)}{(A + D) + (B + D) + (B + E) + (C + E)} \quad \text{and} \quad (4)$$

$$V = \frac{A + C + 2B - 2D - 2E}{A + C + 2B + 2D + 2E} \quad (5)$$

where A through E are as defined pictorially in FIG. 11.

Figure 12:
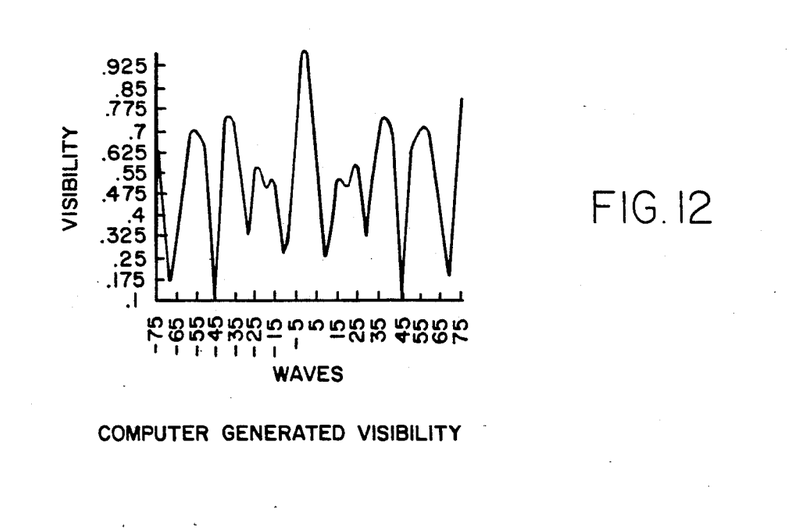
FIG. 12 is a chart of the computer generated visibility of the fringe patttern of FIG. 11.

This algorithm was simulated using six wavelengths of the argon spectrum. Each wavelength was assigned a relative power weighting, as presented previously. FIG. 12 shows the computer generated results. (Note only 0 to 75 waves OPD was generated since the function is even −75 to 0 was plotted as a mirror image of the generated results for a better comparison with the experimental results for a better comparison with the experimental results.) The curve does provide a global measure of the zero fringe as was desired. The combining of two lobes on either side of the central lobe and the small amount of structure on each lobe is attributed to the spatial quanitization of the focused fringe pattern.

Differencing of the integrated and sidelobes of two sample beams, using the linear algorithm of Equation 2, is an accurate linear measure of optical path difference. Experimental results have achieved calculated accuracies of better than λ/100. A global nonlinear measure of zero OPD can be achieved through Equation 3, a variation of Michelson's visibility definition. Experimental results have been used to validate predicted performance for the main features of each algorithm.

Note that the linear algorithm of Equation 2 as well as the global algorithm of Equation 3 are incorporated by reference from the patent application filed by Richard A. Carreras entitled "Microcomputer Controlled Image Processor", and described in Air Force Invention No. 16,652 and U.S. patent application Ser. No. 689,700, filed Jan. 8, 1985.

An important consideration for algorithm selection, is that the estimate of OPD should not be overly sensitive to the alignment of the optics and the detectors. The irradiance pattern should be able to move somewhat on the detector array without substantially affecting the OPD estimate. The approach taken to minimize the alignment sensitivity was to try to measure the asymmetry of the irradiance pattern relative to the central peak of the irradiance profile. When OPD=0.0, the subsidiary peaks to the left and right of the main peak have the same height, i.e., a detector under a peak on the right of the main peak will collect as much energy as the symmetrically located detector on the left of the main peak. Examining FIGS. 4 and 5, we see that as OPD increases from 0.0, the peaks on one side of the pattern increase while those on the other side decrease. All of the algorithms described below use the asymmetry of the pattern as an indicator of the OPD. With each algorithm, the first step is to scan the detector array to find the detector with the maximum output. In practice, only a few detectors must be examined since the approximate location of the peak is known from the previous measurement.

From the information obtained by the interference pattern, the following set of alternative algorithm may be used to calculate the OPD. Each of these alternative algorithms are implemented into the linear algorithm of Equation 2, above, and are specified by defining R and L, which is:

$$OPD = \frac{\int R - \int L}{\int R + \int L} \quad (2)$$

where R and L are the product of the algorithms given below.

Algorithm 1: The basic idea of the first algorithm is to compare the heights of the subsidiary peaks immediately to the left and right of the main peak. For this algorithm, the expression for $I_n$ will denote the output of the nth detector in the detector array. The peak otput is assumed to occur at detector number $n_p$, i.e., $I_{np} \geq I_n$ for all n.

The fringe spacing is determined by the sample separation. It is assumed that there are $n_F$ detectors per fringe, that is, between consecutive nulls in the interference pattern. Therefore algorithm 1 is given by defined R and L as:

$$R = I_{(n_p + n_F)}$$

$$L = I_{(n_p - n_F)}$$

Algorithm 2: This algorithm is a variation of algorithm 1 in which an effort is made to more accurately estimate the height of the side peaks. Let $x_n$ denote the nth detector. R is given by the peak value of the quadratic fit to $(x_n, I_n)$ for $n = n_p + n_F - 1, n_p + n_F n_p + n_F + 1$.

Algorithm 3: Instead of using only the peak irradiance of the sidelobes, this algorithm uses all the energy in the peaks immediately to the right and left of the main peak.

$$R = \sum_{n = n_p + n_F/2}^{n_p + 3n_F/2} I_n$$

$$L = \sum_{n = n_p - 3n_F/2}^{n_p - n_F/2} I_n$$

Algorithm 4: This algorithm uses the peak values of the irradiance in the first two sidelobes on either side of the central peak.

$$R = I_{(n_p + n_F)} + I_{(n_p + 2n_F)}$$

$$L = I_{(n_p + n_F)} + I_{(n_p + 2n_F)}$$

Algorithm 5: Algorithm 5 uses all the energy under both subsidiary peaks on the either side of the main peak.

$$R = \sum_{n = n_p + n_F/2}^{n_p + 5n_F/2} I_n$$

$$L = \sum_{n = n_p - 5n_F/2}^{n_p - n_F/2} I_n$$

Algorithm 6: This algorithm is a generalization of algorithm 1, 3, 4 and 5. It was thought that a better signal to noise ratio might be achieved if more than one detector per peak were used but that detectors near the nulls should be avoided. For algorithm 6, R is equal to the sum of N1 detectors centered on the first peak to the right of the main peak and N2 detectors centered on the second right subsidiary peak. L is obtained by summing the outputs of the corresponding detectors to the left of the main peak.

Algorithm 7: The total variation of the irradiance pattern on either side of the main peak is used.

$$R = \sum_{n \geq n_p} (I_{n+1} - I_n)$$

$$L = \sum_{n < n_p} (I_{n+1} - I_n)$$

Algorithm 8: This algorithm uses a slightly different measure of the variation $$R = \sum_{n \geq n_p} (I_{n+1} - I_n)$$

$$L = \sum_{n < n_p} (I_{n+1} - I_n)$$

The noise sensitivity of the various algorithm, as used to determine OPD (the estimated value of OPD), was assessed. In the experiment, the beam samples are focused onto a linear CCD array. Using the expected noise characteristics of the detectors, the RMS value of OPD was computed using a Monte Carlo Simulation with an input of OPD of zero. Four discrete laser wavelengths were used in the simulation, and eleven detectors per fringe were assumed. Detector cross talk and spatial averaging over the detector area were included in the simulation.

The results of this simulation are shown in Tables 1 and 2 where the RMS value of OPD in waves is shown for each of the algorithms.

TABLE 1

| Algorithm Noise Sensitivity | |
|---|---|
| Algorithm | RMS OPD (WAVES) |
| 1 | 0.0085 |
| 2 | 0.0075 |
| 3 | 0.0044 |
| 4 | 0.0058 |
| 5 | 0.0037 |
| 6 | |
| 7 | 0.0078 |
| 8 | 0.0094 |
| 9 | 0.0045 |

RMS value of OPD with an input OPD = 0.
Noise = Gaussian random variable with standard deviation = .005 × maximum detector output.

TABLE 2

| Algorithm Noise Sensitivity (Algorithm 6) | | |
|---|---|---|
| N1 | N2 | RMS OPD (WAVES) |
| 3 | 1 | 0.0035 |
| 3 | 3 | 0.0031 |
| 5 | 3 | 0.0027 |
| 5 | 5 | 0.0025 |
| 7 | 5 | 0.0023 |

RMS value of OPD using Algorithm 6 with an input OPD = 0 and N1 detectors under first side lobes, N2 detectors under second sidelobes.

Another test was performed to evaluate the linearity of the OPD estimate as a function of the input OPD. For this test, detector noise was set to zero, and OPD was computed as a function of OPD over the range from zero to a half wave.

Figure 13:
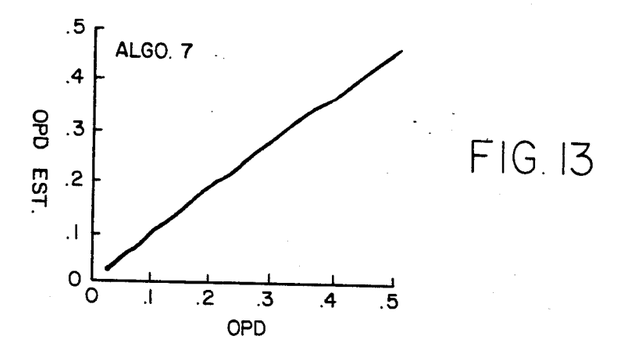
FIG. 13 is a chart of estimated OPD produced by algorithm 7 versus actual OPD.

For each of the algorithms, the graph of Estimated OPD vs. OPD possessed one of two characteristic shapes. FIG. 13 shows Estimated OPD vs. OPD for algorithm 7. The behavior is highly linear. The corresponding graphs for algorithms 2, 3, and 5 are virtually identical to FIG. 13.

Figure 14:
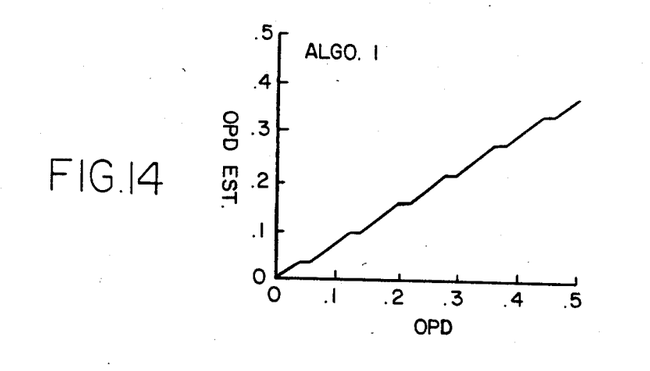
FIG. 14 is a chart of estimated OPD produced by algorithm 1 versus actual OPD.

For the other algorithms, however, the behavior of Estimated OPD as a function of OPD is markedly different. FIG. 14 shows Estimated OPD vs. OPD for algorithm 1. Algorithms 4 and 8 display similar behavior as does algorithm 6 for all values of N1 and N2 except those values for which algorithm 6 reduces to either algorithms 3 or 5. To perform the calculations used to generate FIG. 14, it was assumed that when the OPD was zero, the central peak in the interference pattern was centered on a detector element. The flat spots in the curve correspond to values of the OPD for which the center of the central peak falls on the boundary between two detectors. If the curve had been generated using an assumption that the primary irradiance peak was centered between two detectors when OPD=0, then a flat spot would have occurred at the origin. In that case, OPD would almost completely insensitive to the input OPD for small changes in the OPD about zero.

Among the algorithms which exhibited good linearity, algorithms 3 and 5 were the preferred choices because of their relative insensitivity to noise. Algorithm 5 is somewhat superior in this regard, but it requires approximately twice as much processing as algorithm 3. Hence, algorithm 3 is a preferred choice for estimating the value of OPD, due to its excellent linearity, good noise rejection, and modest requirements for processing.

Figure 15:
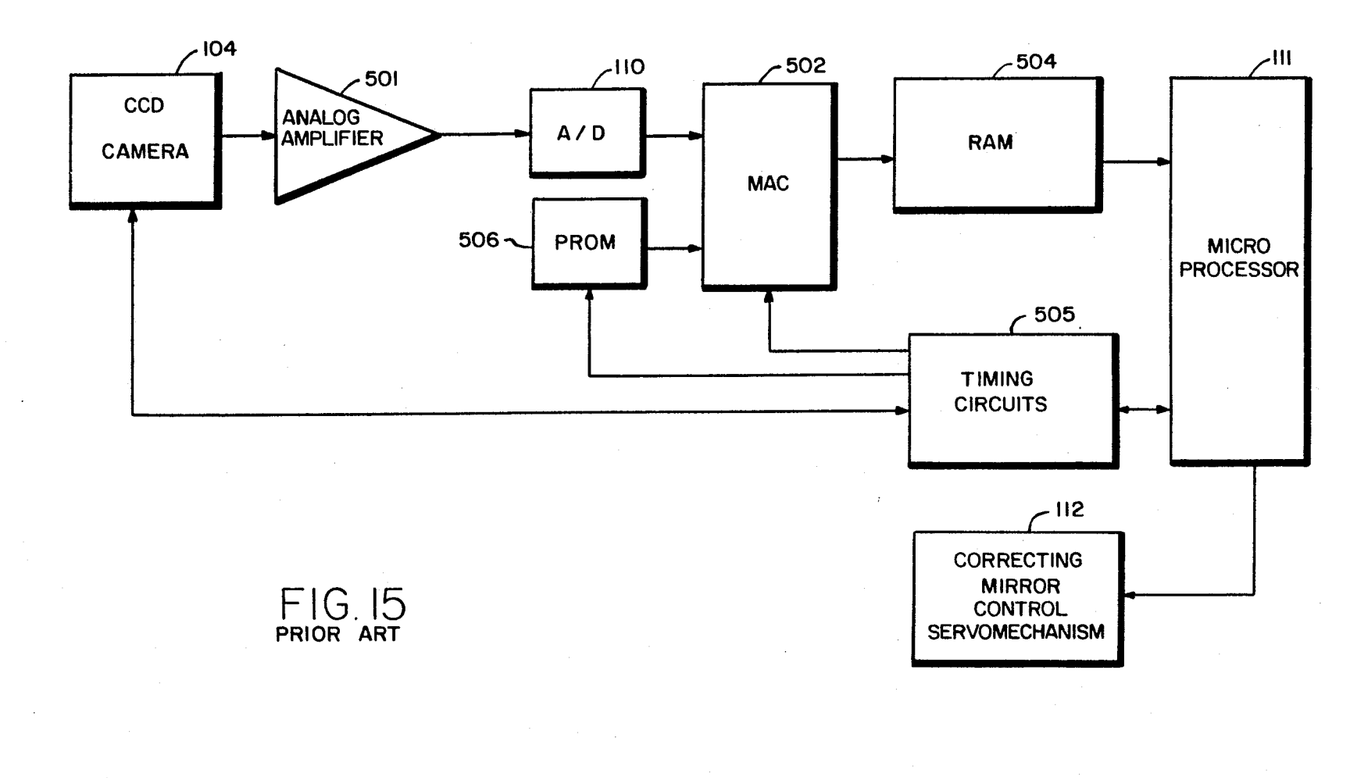
FIG. 15 is the microcomputer controlled image processor of the Carreras invention.

FIG. 15 is a block diagram of the Carreras invention discussed earlier and incorporated herein by reference. The Carreras invention performs the functions ascribed to the A/D converter 110 and microprocessor 111 of FIG. 2 of the present invention. The CCD camera 104 generates an analog signal depicting the interference pattern between at least one pair of simplified laser beams. The analog amplifier 501 and analog-to-digital (A/D) converter 110 amplifies and converts the interference pattern into a digital signal. In the embodiment of the invention of FIG. 5, the A/D converter is a 9-bit converter which digitizes the analog signal from the CCD camera 104 at 5 MHz and is running at a 1 KHz frame rate.

The digital interference signal is input into a multiple accumulator controller (MAC) 50 where the camera data is multiplied and added to correction factors to compensate for any known non-linearities of the CCD camera 104. The programmable read-only-memory (PROM) 506 stores and repeatedly supplies these correction factors to the MAC 502.

The corrected interference pattern is sent from the MAC 502 to a random access memory (RAM) 504 which stores and supplies the interference pattern to the microprocessor 111. The size of the random access memory is dependent upon the number of telescopes in the array of the laser transmitter. The example of an array of just two telescopes is presented only to demonstrate the technique of aligning the phase of one telescope with another. However by using the beam of any one telescope as a reference, an array of virtually an unlimited number of telescopes, all of which could be phased matched with the reference beam.

The microprocessor 111 shown in FIG. 5 is a 16/32 bit Motorola M68000. As mentioned above in the discussion of the RAM 504, the selection of the microprocessor is dependent upon the size of the array. The microprocessor 11 is capable of applying the algorithms to the interference pattern data to yield estimates of the optical path difference (OPD) between the two sampled laser beams.

When the optical path difference is supplied to the correcting mirror control servomechanism 112 of the laser transmitter, the length of the optical path of one or both of the sampled beams can be adjusted to bring the beams in phase with each other.

Returning now to FIG. 2, the microprocessor 111 outputs an accurate estimate of the difference in optical path lengths of the two beams, A and B, transmitted from the primary telescopes 101 and 102. While the adjustment means may be any one of a number of devices known in the art, the principle of the adjustment means should be consistent with the embodiment of FIG. 2, in which the optical path lengths of the transmitted beams, A and B, are adjusted in accordance with the output of the microprocessor.

In FIG. 2, the adjustment means consists of a servomechanism 112 and a set of correcting mirrors 120. The set of correcting mirrors possess variable optical path lengths. These mirrors simply intercept and relay the transmitted beams with optical path lengths that are adjusted by the correcting mirror control mechanism 112, which is in turn, adjusted by the output of the microprocessor 111. The result is an optically phased laser transmitter from an array of two telescopes.

As mentioned above, the example of an array of just two telescopes is presented only to demonstrate the technique of aligning the phase of one telescope with another. However, by using the beam of any one telescope as a reference, an array of virtually an unlimited number of telescopes, all of which could be phased matched with the reference beam.

Figure 16:
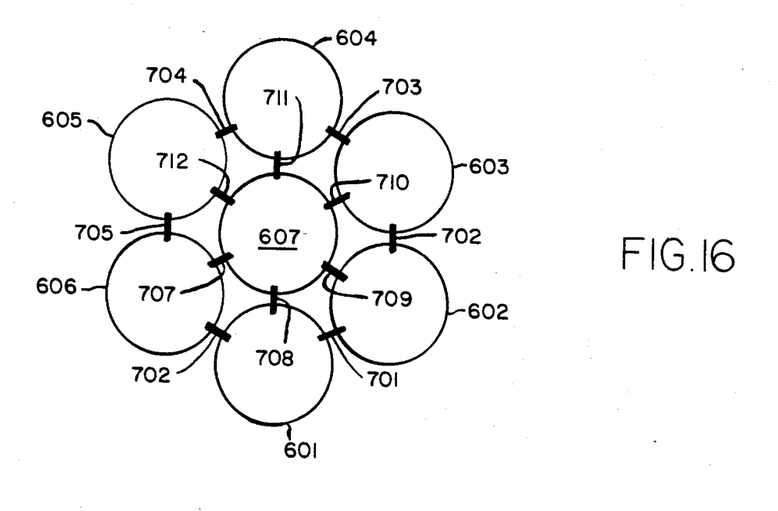
FIG. 16 is an illustration of the phasing technique of the present invention as it applies to an array of multiple telescopes.

FIG. 16 is an illustration of the optical phasing technique of the present invention applied to an array of primary telescopes 601-607 which are interconnected by a plurality of collecting telescopes 710-712. The single 2-array example of FIG. 2 can be literally applied to FIG. 16 as a model of operation. In this phasing scheme, all the primary telescopes 601-606 would be compared with, and adjusted to, the phase of the center primary telescope 607. If this approach is followed, the only collecting telescope acutally needed are the center ones 707-712, that intercept both the center primary telescope 607, and one of the outer primary telescopes 601-606. If the technique of FIG. 2 is literally followed, the beams of the outer primary telescopes 601-606 will be collected, compared to, and adjusted to the beam of the center telescope 607 by a signal processing system analogous to that of FIG. 2.

The embodiment of FIG. 16 is presented with a plurality of collector telescopes 701-702 to illustrate the many alternative approaches that the present invention may pursue. Just as a phased array radar system may separately steer different wavefroms, different areas of the optically phased laser transmitter may be separately phased. For example, telescopes 601-603 may be phased to produce one beam while telescopes 604-607 produce a separate beam. In short, all the advantages of flexibility, as well as modularity, reliability, etc. discussed earlier and experienced by radar systems, is extended to laser transmitters by the current invention system of phasing an array of multiple telescopes.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A laser transmitter which produces an output by phase matching all outputs of an array of independent laser telescopes including a first primary telescope which has a first singular laser source which emits a first laser beam, and a plurality of second primary telescopes each placed in a position adjacent to said first primary telescope, each of said second primary telescopes having their own independent and singular laser source emitting their own independent second laser beams thereby creating a plurality of second laser beams, said laser transmitter comprising:

a plurality of collecting telescopes facing and bridging said first and second primary telescopes, each of said plurality of collecting telescopes intercepting and diverting a sample of said first laser beam from said first primary telescope and a sample of said second laser beams from one of said plurality of second primary telescopes by partially blocking the first and second laser beams, said plurality of collecting telescopes reflecting all intercepted beams back in sets of focus points, each of said focus points being a focused pair of said sample from said first primary telescope and a sample of said second laser beam which is obtained from the first and second primary telescopes which are bridged by that particular collecting telescope;

a detector array means receiving said sets of focus points from said plurality of said collecting telescopes and generating therefrom a set of interference patterns between each second laser beam from said plurality of second primary telescopes and the first laser beam from said first primary telescope;

an analog-to-digital converter receiving and converting into a set of digital signals said set of interference patterns from said detector array means;

a data processor means receiving said set of digital signals from said analog-to-digital converter and estimating an optical path length adjustment amount between each of said second laser beams and said first laser beam, said optical path adjustment amount being a measure of distance between the optical path lengths of said first laser beam and an associated second laser beam such that the application of said optical path length adjustment amount to the optical path of the second laser beam results in a matching of the phase of said second laser beam to said first laser beam; and a correcting means receiving said optical path length adjustment amount from said data processor and receiving said first and second laser beams from said first and second primary telescopes, said correcting means performing an adjustment of the optical path length of each of said second laser beams to match their phases with said first laser beam.

2. A laser transmitter as defined in claim 1, including:

a conducting means receiving and conducting said sets of focus points from said plurality of collecting telescopes; and a focusing means receiving and focusing said sets of focus points from said conducting means onto said detector array means.

3. A laser transmitter as defined in claim 2 wherein said detector array means comprises a charge coupled device camera which outputs an interference pattern for each pair of focused beams input into it, said charge coupled device camera receiving said sets of focus points from said focusing means and generating therefrom said set of interference patterns between each said second laser beam and said first laser beam.

4. A laser transmitter as defined in claim 3, wherein said correcting means comprises:

a plurality of first and second correcting mirrors having an adjustable optical path length between them, each of said first correcting mirrors receiving and relaying to one of said second correcting mirrors one of said second laser beams from said plurality of second primary telescopes, each of said second correcting mirrors receiving and reflecting out of said laser transmitter one of said second laser beams; and an adjustment servomechanism receiving said optical path length adjustment amount from said data processor means and adjusting the optical path lengths between each of said first and second correcting mirrors so that the phase of each of said second laser beams is matched to the phase of said first laser beam from said first primary telescope.

5. A laser transmitter as defined in claim 4, wherein said conducting means comprises:

a plurality of first and second fold mirrors with each first fold mirror receiving and relaying one of the laser beams from said first and second primary telescopes;

said second fold mirror receiving and relaying the laser beams from said first fold mirror to said focusing means.

6. A laser transmitter as defined in claim 5, wherein said focusing means comprises a plurality of lenses, with each lens receiving and focusing said samples of said first and second laser beams on the surface of said charge coupled device camera in a form of containing a left sample beam having a radius of value b, and a right sample beam having a radius of value b, and being separated from said left sample beam by a distance of 2 a, said left and right sample beams being placed in a plane having x and y coordinates, said left sample beam having its center placed on an x axis at a point where the value of x equals $-a$ and the value of y equals zero, said right sample beam having its center placed on said x axis at a point where the value of x equals a, and the value of y equals zero.

7. A laser transmitter as defined in claim 6, wherein each of said sets of interference patterns produced by said charged coupled device comprises:

a irradiance pattern given by the formula:

$$I_n(r) = (2A_n b/r)^2 J^2{}_1(K_n rb/F) \cdot [1 + \cos(K_n(d - + 2ax/F))];$$

where:

$I_n(r)$ is the measure of irradiance;

$A_n$ is the amplitude of incident light at wavelength $\lambda n$;

b is the value for the radius of the left and right samples;

r is a measure of position on said x and y plane at position (x,y) as a value of radial coordinate;

λ is the wavelength of incident light;

$K_n$ equals $2\pi/\lambda_n$;

F is the focal length of the collecting optics of said collecting telescopes;

d is the difference in optical path length of two beams being compared;

$n_p$ is an integer which represents a detector number within said detector array, which contains n detectors;

$n_F$ is an integer which represents a number of detectors per fringe, between consecutive nulls in said interference pattern; and a is one half of the value of distance of separation between the two beams being compared.

8. A laser transmitter as defined in claim 7, wherein said data processor means includes:

a computer which receives each of said sets of said interference patterns in the form of a measurement of said irradiance pattern which has been converted into a digital form by said analog to digital converter, said computer producing each of said optical path length adjustment amounts using the formula:

$$OPD = \frac{\int R - \int L}{\int R + \int L};$$

where: OPD equals the optical path length adjustment amount between two beams which are being compared, and OPD equals an amount of λ, where λ equals a power weighted average of the wavelengths of said two beams which are being compared;

wherein said computer determined said R and L values using an algorithm, said algorithm comprising:

$R = I(n_p + n_F);$ and $L = I(n_p - n_F)$ where: $I(n)$ denotes an output of an $n^{th}$ detector in said detector array means.

9. A laser transmitter as defined in claim 7, wherein said data processor means includes:

a computer which receives each of said sets of said interference patterns in the form of a measurement of said irradiance pattern which has been converted into a digital form by said analog to digital converter, said computer producing each of said optical path length adjustment amounts using the formula:

$$OPD = \frac{\int R - \int L}{\int R + \int L};$$

where OPD equals the optical path length adjustment amount between two beams which are being compared, and OPD is defined in terms of an amount of λ, where λ equals a power weighted average of the wavelengths of said two beams which are being compared; and wherein said computer is capable of determining said R and L values using an algorithm, said algorithm comprising:

$$R = \sum_{n=n_p+n_F/2}^{n_p+3n_F/2} I_n$$

$$L = \sum_{n=n_p-3n_F/2}^{n_p-n_F/2} I_n;$$

where $I(n)$ denotes an output of an nth detector in said detector array means, said algorithm using all the energy in subsidiary peaks of said interference pattern which are to the left and right of a main peak.

10. A laser transmitter as defined in claim 7, wherein said data processor means includes:

a computer which receives each of said sets of said interference patterns in the form of a measurement of said irradiance pattern which has been converted into a digital form by said analog to digital converter, said computer producing each of said optical path length adjustment amounts using the formula:

$$OPD = \frac{\int R - \int L}{\int R + \int L};$$

where OPD equals the optical path length adjustment amount between two beams which are being compared, and OPD is defined in terms of an amount of λ, where λ equals a power weighted average of the wavelengths of said two beams which are being compared; and wherein said computer is capable of determining said R and L values using an algorithm, said algorithm comprising:

$R = I(n_p + n_F) + I(n_p + 2n_F)$ $L = I(n_p + n_F) + I(n_p + 2n_F);$ where $I(n)$ denotes an output of an $n^{th}$ detector in said detector array means, said algorithm using all peak values of irradiance in the first two subsidiary sidelobes on either side of a central peak.

11. A laser transmitter as defined in claim 7, wherein said data processor means includes:

a computer which receives each of said sets of said interference patterns in the form of a measurement of said irradiance pattern which has been converted into a digital form by said analog to digital converter, said computer producing each of said optical path length adjustment amounts using the formula:

$$OPD = \frac{\int R - \int L}{\int R + \int L};$$

where OPD equals the optical path length adjustment amount between two beams which are being compared, and OPD is defined in terms of an amount of λ, where λ equals a power weighted average of the wavelengths of said two beams which are being compared; and wherein said computer is capable of determining said R and L values using an algorithm, said algorithm comprising:

$$R = \sum_{n=n_p+n_F/2}^{n_p+5n_F/2} I_n$$

$$L = \sum_{n=n_p-5n_F/2}^{n_p-n_F/2} I_n;$$

where $I(n)$ denotes an output of an $n^{th}$ detector in said detector array means, and said algorithm uses all the energy in subsidiary peaks on either side of a main peak in said interference pattern.

12. A laser transmitter as defined in claim 7, wherein said data processor means includes:

a computer which receives each of said sets of said interference patterns in the form of a measurement of said irradiance pattern which has been converted into a digital form by said analog to digital converter, said computer producing each of said optical path length adjustment amounts using the formula:

$$OPD = \frac{\int R - \int L}{\int R + \int L};$$

where OPD equals the optical path length adjustment amount between two beams which are being compared, and OPD is defined in terms of an amount of $\lambda$, where $\lambda$ equals a power weighted average of the wavelengths of said two beams which are being compared; and wherein said computer is capable of determining said R and L values using an algorithm, said algorithm comprising:

$$R = \sum_{n \geq n_p} (I_{n+1} - I_n)$$

$$L = \sum_{n \geq n_p} (I_{n+1} - I_n);$$

where $I(n)$ denotes an output of an nth detector in said detector array means, said algorithm using all variations in said interference pattern on either side of a main peak.

13. A laser transmitter as defined in claim 7, wherein said data processor means includes:

a computer which receives each of said sets of said interference patterns in the form of a measurement of said irradiance pattern which has been converted into a digital form by said analog to digital converter, said computer producing each of said optical path length adjustment amounts using the formula:

$$OPD = \frac{\int R - \int L}{\int R + \int L};$$

where OPD equals the optical path length adjustment amount between two beams which are being compared, and OPD is defined in terms of an amount of $\lambda$, where $\lambda$ equals a power weighted average of the wavelengths of said two beams which are being compared; and wherein said computer is capable of determining said R and L values using an algorithm, said algorithm comprising:

$$R = \sum_{n \geq n_p} (I_{n+1} - I_n)$$

$$L = \sum_{n < n_p} (I_{n+1} - I_n)^2;$$

where $I(n)$ denotes an output of an $n^{th}$ detector in said detector array means.

14. A laser transmitter as defined in claim 13, wherein said first and second laser beams comprises monochromatic light.

15. A laser transmitter as defined in claim 14, wherein said adjustment of the optical path lengths of said second laser beams to match its phase with said first laser beams comprises:

a correction of said optical path lengths of said second laser beam to approximately equal said optical path length of said first laser beam to within a range of one wavelength of said monochromatic light, plus integral multiples of $2\pi$ of said wavelength of monochromatic light.

16. A laser transmitter as defined in claim 13, wherein said first and second laser beams comprise polychromatic light.

17. A laser transmitter as defined in claim 16, wherein said adjustment of the optical path lengths of said second laser beam to match its phase with said first laser beam comprises an adjustment of the optical path lengths of said second laser beams within less than one wavelength of said polychromatic light.

* * * * *